United States Patent Office 3,444,252
Patented May 13, 1969

3,444,252
MANUFACTURE OF CHLORINATED
HYDROCARBONS
Joseph Horsefield Brown and Ulrich Carl Werner Kopsch, Widnes, England, assignors to Imperial Chemical Industries Limited, London, England, a corporation of Great Britain
No Drawing. Filed Oct. 18, 1965, Ser. No. 497,443
Claims priority, application Great Britain, Sept. 29, 1965, 41,360/65
Int. Cl. C07c *21/10, 17/10*
U.S. Cl. 260—654
12 Claims

ABSTRACT OF THE DISCLOSURE

Process for the manufacture of trichloroethylene by reacting hydrogen chloride and elemental oxygen with acetylene in the vapor phase in the presence of a Deacon catalyst and steam and/or a vaporizing liquid chlorinated hydrocarbon which functions as a diluent. The reaction temperature is in the range 100° C. to 350° C. and the acetylene is advantageously used in admixture with ethylene.

---

This invention relates to a process for the manufacture of trichloroethylene.

It is disclosed in copending U.S. application Ser. No. 497,515, filed on Oct. 18, 1965, and assigned to the present assignee, that trichloroethylene can be obtained in a single stage together with dichloroethylenes as by-products by bringing into reaction hydrogen chloride and a source of elemental oxygen with a source of acetylene in the vapour phase in the presence of a Deacon catalyst. It is further disclosed in said application that when a source of relatively pure acetylene is available this may, if desired, be diluted as a positive step with an inert gas such as nitrogen or with a recycle gas which is a reaction product comprising trichloroethylene.

It is also disclosed that sources of acetylene may be utilised which owing to their method of preparation are already diluted with gases such as hydrogen, nitrogen, carbon oxides, methane and which may also contain ethylene.

We have now found that such a process as is described in said copending application may be operated in a particularly useful manner when introducing a specific gaseous diluent and/or a vaporising liquid which function at least in part as a diluent.

According to the present invention therefore we provide a process which comprises bringing into reaction hydrogen chloride and a source of elemental oxygen with a source of acetylene in the vapour phase in the presence of a Deacon catalyst, and in the presence of steam and/or a vaporising liquid which function at least in part as a diluent.

Deacon catalysts are well known as catalysts useful in the oxidation of hydrogen chloride to chlorine and comprise the compounds of metals of variable valency such as, for example, copper chloride supported on a solid such as, for example, activated alumina. Such a catalyst may contain an alkli metal chloride such as potassium chloride. Compounds of elements of variable valency other than those of copper may be present in the catalyst.

The source of elemental oxygen may suitably be oxygen itself, air or a gas containing an enhanced proportion of oxygen.

The process may be carried out with a static bed of catalyst but preferably a fluidised bed is employed. Normal or superatmospheric pressures may be employed.

Steam is a particularly useful diluent in the present process. Moreover steam together with hydrogen chloride may be obtained by the flash vaporisation of aqueous hydrochloric acid. Thus steam utilised as diluent and hydrogen chloride which is consumed in the reaction may be obtained from a cheap source of by-product, aqueous hydrochloric acid.

The main advantage of using steam instead of other gaseous diluents, for instance nitrogen, is that the steam can be condensed with practically the whole of the organic reaction products and then is readily separable from the liquid condensate. However if nitrogen is used, then after the bulk of the organic products have been condensed out, one is left with the difficult problem of economically separating and recovering the residual organic vapours which remain entrained in a large volume of a permanent gas. Used as a diluent in this way, steam can still contribute a distinct advantage even when the source of the acetylene is one which is already diluted with inert gases such as nitrogen, and when a mixed acetylene/ethylene feed stock is used in the process of the invention. Steam may be utilised in a static bed reactor or fluidised bed reactor.

Diluents which may be introduced in the reactor in the form of vaporisable liquids include, for example, water and organic compounds including trichloroethylene, perchloroethylene and dichloroethylene which may be obtained from the process and then recycled. By introducing such a liquid diluent the reaction temperature can be controlled by utilising the sensible heat and latent heat of vaporisation of the liquid to remove heat. By employing aqueous hydrochloric acid as vaporising liquid there is provided steam and hydrogen chloride which is consumed in the reaction. The liquids are most conveniently introduced into a fluidised bed reactor.

In association with the main product trichloroethylene, there are produced as by-products in the process dichloroethylenes, mainly trans-dichloroethylene.

Suitably the molar ratio of acetylene to oxygen is in the range 1.3:1 to 1.7:1. Lower or higher molar ratios than these can be employed although there should be taken into account that with lower ratios the reaction is not so clean in that 1:2-dichloroethane, 1:2:2-trichloroethane and higher chloroethanes are found in the reaction product while with higher ratios of acetylene/oxygen a reduced acetylene conversion is obtained. Preferably the molar ratio of acetylene/oxygen is in the range 1.3:1 to 1.4:1 and particularly useful results are obtained when using a molar ratio of acetylene/oxygen of approximately 1.35:1. Thus when using the latter molar ratio $C_2H_2$ conversions of approximately 95% can be obtained with formation of approximately equimolar amounts of trichloroethylene and dichloroethylenes, mainly trans-dichloroethylene. When using molar ratios of acetylene to oxygen of approximately 1.45:1 to 1.67:1 conversions on $C_2H_2$ of approximately 80%, in any case not usually not more than 90%, are obtained. The mechanism whereby the reaction ensues is involved and is not fully understood but it is a fact that good yields of trichloroethylene may be obtained from acetylene according to the process of the invention. However it is suggested that under optimum conditions the reaction of the present process may be approximately represented as follows:

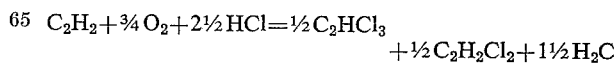

This corresponds to a molar feed ratio of the reactants, that is, $HCl/C_2H_2/O_2$ of 2.5:1:0.75. This contrasts sharply with the reaction involving oxychlorination of ethylene wherein the corresponding ratio of $HCl/C_2H_4/O_2$ is 2:1:0.5.

Suitably the oxychlorination of acetylene to give trichloroethylene (and dichloroethylenes as by-products) is carried out at a temperature in the range 100° C. to 350° C., preferably 200° C. to 275° C.

The present invention also envisages within its scope the combined process wherein following the catalytic process and, after recovery of the trichloroethylene, any unchanged ethylene from a feed gas containing the same is utilised in a second reaction zone by means of a suitable reagent to convert the ethylene into useful products. For example, unchanged ethylene may be chlorinated or oxychlorinated to 1:2-dichloroethane. This can be pyrolysed to give vinyl chloride and hydrogen chloride, the latter being utilised in the oxychlorination of the acetylene or ethylene.

The dichloroethylenes, mainly trans-dichloroethylene, which are formed in the reaction may be further utilised by chlorination or oxychlorination to give trichloroethylene and/or tetrachloroethanes which can be cracked to give more trichloroethylene. Hydrogen chloride evolved by such chlorination reactions can in turn be utilised in the oxychlorination of the acetylene or ethylene. Alternatively, if the demand requires it, the dichloroethylenes may be hydrochlorinated to give 1:2:2-trichloroethane which is an intermediate for 1:1-dichloroethylene and 1:1:1-trichloroethane.

The following example illustrates but does not limit the invention.

Example 1

The reactor consisted of a vertical, heat-resistant, glass tube 60 cm. long and of 2.1 cm. internal diameter and was equipped with a central thermocouple pocket 0.85 cm. in diameter. A spiral of 0.32 cm. nickel wire was fixed tightly by tension to the internal reactor walls and a similar spiral was wound tightly round the thermocouple pocket. The pitch of both spirals was 7.5 cm. The spirals served to prevent slugging of the bed. (This type of fluidised bed reactor is described in our copending British application No. 41,359/65).

Into the annulus between the glass tube and the thermocouple pocket were placed 75 g. of a Deacon catalyst consisting of cupric chloride and potassium chloride supported on microspheroidal alumina. The catalyst contained 5% by weight copper and 2.8% by weight potassium. Steam was obtained by the flash vaporisation of water in a tube and hydrogen chloride, oxygen and acetylene were passed through the tube and mixed with the steam. Steam and hydrogen chloride were fed in at a rate corresponding to that which would be derived from flash vaporisation of 90.5 g./hr. of 33.7% hydrochloric acid. The gaseous feed was fed to the reactor and maintained the catalyst in the fluidised state. A run was also carried out in which both steam and gaseous trichloroethylene were used as diluents. Another run was also carried out in which both steam and trans-dichloroethylene were used as diluents. The effluent gas from all runs was readily condensed. The reaction conditions and results obtained are indicated in Table 1.

TABLE 1

| Dilution of feed by | Steam | Steam | Steam | Steam and $C_2HCl_3$ | Steam and trans $CHCl=CHCl$ |
|---|---|---|---|---|---|
| Mole ratio $C_2H_2/O_2$ | 1.67 | 1.45 | 1.3 | 1.3 | 1.3 |
| Feed rate, l./h. | 112 | 111.5 | 111.5 | 111.5 | 111.3 |
| Composition of feed, percent v./v.: | | | | | |
| HCl | 17.8 | 18.0 | 17.94 | 17.94 | 17.94 |
| $C_2H_2$ | 6.7 | 5.85 | 5.82 | 5.82 | 5.82 |
| $O_2$ | 4.0 | 4.05 | 4.49 | 4.49 | 4.49 |
| $H_2O$ | 71.5 | 72 | 71.75 | 69.06 | 69.06 |
| $C_2HCl_3$ | | | | 2.69 | |
| Trans $C_2H_2Cl_2$ | | | | | 2.69 |
| Temperature, ° C. | 216 | 209 | 260 | 260 | 260 |
| $C_2H_2$ conversion, percent | 80 | 83 | 94 | 96.6 | 93.5 |
| $O_2$ conversion, percent | 94 | 90 | 97.8 | 92.4 | 98.0 |
| HCl conversion, percent | 72.8 | 68.5 | 85.1 | 81.0 | 77.4 |
| Burning rate, percent | 0.25 | 0.4 | 0.5 | 0.5 | 0.3 |
| Spare time yield in g./h./l./expanded bed | 279 | 260 | 301 | 306 | 293 |
| Composition of condensate mole, percent: | | | | | |
| $CH_2=CCl_2$ | 1.95 | 1.3 | 4.5 | 4.25 | 2.3 |
| Trans $CHCl=CHCl$ | 51.5 | 43.4 | 27.7 | 20.2 | 57.5 |
| Cis $CHCl=CHCl$ | 5.55 | 5.5 | 8.5 | 5.85 | 5.3 |
| $C_2HCl_3$ | 38.3 | 44.6 | 55.2 | 67.8 | 32.3 |
| $C_2Cl_4$ | 2.7 | 5.2 | 4.1 | 1.9 | 2.6 |

Particularly high conversions of $C_2H_2$, $O_2$ and HCl and high space time yields were obtained with a mole ratio of $C_2H_2:O_2$ of 1.3:1. Trichloroethylene and trans-dichloroethylene when added to the feed gases did not adversely affect the reaction and were recovered in the organic phase of the reaction product.

What we claim is:
1. A process for the manufacture of trichloroethylene which comprises reacting hydrogen chloride and elemental oxygen with acetylene in the vapour phase in the presence of a Deacon catalyst and at a temperature in the range of 100° C. to 350° C. and in the presence of a member selected from the group consisting of steam and mixtures of steam with a vaporising liquid chlorinated hydrocarbon which functions at least in part as a diluent and wherein the ratio of oxygen/acetylene/HCl is 1:1.3–1.7:3.25–5.1.

2. A process as claimed in claim 1 in which the reaction temperature is in the range 200° C. to 275° C.

3. A process as claimed in claim 1 in which steam, utilised as diluent in the reaction and hydrogen chloride which is consumed in the reaction, are obtained by flash vaporisation of aqueous hydrochloric acid.

4. A process as claimed in claim 1 in which the vaporising liquid introduced in the reaction zone is selected from the group consisting of water, aqueous hydrochloric acid, trichloroethylene, perchloroethylene, or dichloroethylenes.

5. A process as claimed in claim 1 in which a fluidised bed of catalyst is employed.

6. A process as claimed in claim 1 in which a static bed of catalyst is employed.

7. A process as claimed in claim 1 in which the molar ratio of acetylene to oxygen in the range 1.3:1 to 1.4:1 is employed.

8. A process as claimed in claim 7 in which the molar ratio of acetylene/oxygen of approximately 1.35:1 is employed.

9. A process for the manufacture of trichloroethylene which comprises reacting hydrogen chloride and elemental oxygen with acetylene in the vapour phase in the presence of a Deacon catalyst and at a temperature in the range 100° C. to 350° C. and in the presence of a member selected from the group consisting of steam and mixtures of steam with a vaporising liquid chlorinated hydrocarbon which functions at least in part as a diluent, and wherein the ratio of hydrogen chloride, acetylene and oxygen is 2.5:1:0.75.

10. A process according to claim 9 wherein the catalyst contains copper.

11. A process according to claim 10 wherein the catalyst is copper chloride supported on alumina.

12. A process for the manufacture of trichloroethylene which comprises reacting hydrogen chloride and elemental oxygen with acetylene in the vapour phase in the presence of a Deacon catalyst and at a temperature in the range 100° C. to 350° C. and in the presence of a member selected from the group consisting of steam and mixtures of steam with a vaporising liquid chlorinated hydrocarbon which functions at least in part as a diluent, and wherein the ratio of oxygen, acetylene, hydrogen chloride is 1:1.3–1.7:3.3–4.5.

References Cited
UNITED STATES PATENTS

| | | | |
|---|---|---|---|
| 2,374,923 | 5/1945 | Cass | 260—659 |
| 2,615,054 | 10/1952 | Miller | 260—656 |
| 2,858,347 | 10/1958 | Hutchings | 260—656 |

BERNARD HELFIN, *Primary Examiner.*

J. BOSKA, *Assistant Examiner.*